United States Patent
Ioannou et al.

(10) Patent No.: US 9,134,970 B2
(45) Date of Patent: Sep. 15, 2015

(54) SOFTWARE DEVELOPMENT METHODOLOGY SYSTEM FOR IMPLEMENTING BUSINESS PROCESSES

(71) Applicant: Oracle International Corporation, Redwood Shores, CA (US)

(72) Inventors: Andrew Ioannou, San Francisco, CA (US); Mark Vilrokx, San Mateo, CA (US); Joel Dupont, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/737,990

(22) Filed: Jan. 10, 2013

(65) Prior Publication Data
US 2014/0196001 A1  Jul. 10, 2014

(51) Int. Cl.
*G06F 9/44* (2006.01)
*G06Q 10/06* (2012.01)

(52) U.S. Cl.
CPC . *G06F 8/35* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 5,734,837 A * | 3/1998 | Flores et al. | 705/7.13 |
| 6,910,204 B1 | 6/2005 | Rossomando | |
| 7,644,390 B2 | 1/2010 | Khodabandehloo et al. | |
| 7,949,993 B2 * | 5/2011 | Milligan | 717/105 |
| 8,457,996 B2 * | 6/2013 | Winkler et al. | 705/7.11 |
| 2002/0078046 A1 | 6/2002 | Uluakar et al. | |
| 2004/0078777 A1 * | 4/2004 | Bahrami | 717/105 |
| 2004/0243968 A1 | 12/2004 | Hecksel | |
| 2007/0179821 A1 * | 8/2007 | Poetsch et al. | 705/7 |
| 2008/0040364 A1 | 2/2008 | Li | |
| 2008/0065454 A1 | 3/2008 | Watanabe | |
| 2008/0086354 A1 | 4/2008 | Nagar | |
| 2008/0120573 A1 * | 5/2008 | Gilbert et al. | 715/835 |
| 2010/0257106 A1 | 10/2010 | Iyer et al. | |
| 2010/0280883 A1 | 11/2010 | Ioannou | |
| 2011/0055106 A1 * | 3/2011 | Von Unwerth et al. | 705/348 |
| 2011/0264574 A1 * | 10/2011 | Dweck et al. | 705/35 |

FOREIGN PATENT DOCUMENTS

WO  2010019564 A1  2/2010

OTHER PUBLICATIONS

Wikipedia, "Agile software development", http://en.wikipedia.org/wiki/Agile_software_developnnent, last downloaded Jan. 8, 2013, pp. 1-13.

* cited by examiner

*Primary Examiner* — Don Wong
*Assistant Examiner* — Devayani R. Ralukdar
(74) *Attorney, Agent, or Firm* — Miles & Stockbridge P.C.

(57) ABSTRACT

A software development tool for developing software that implements a customer's business processes. The software development tool determines a plurality of models to define the software to be developed, wherein at least one model of the plurality of models is a business model that comprises at least one business process, and the at least one business process is a set of interrelated business process paths that accomplish a business goal. The software development tool defines at least one business process path, wherein the at least one business process path is a route through the at least one business process taken during a single execution of the at least one business process, and the at least one business process path comprises at least one step. The software development tool maps the defined at least one business process path to a second model different than the business model, wherein the mapping identifies at least one part of the second model that implements the at least one step of the business process path. The software development tool builds the at least one business process path based on results of the mapping. The software development tool delivers the at least one business process path that has been built.

20 Claims, 10 Drawing Sheets

SOFTWARE DEVELOPMENT METHODOLOGY SYSTEM FOR IMPLEMENTING BUSINESS PROCESSES

FIELD

One embodiment is directed generally to a computer system, and in particular to a computer system that provides a software development tool for developing software that implements a customer's business processes.

BACKGROUND INFORMATION

A software development methodology is an approach used to organize, design, and coordinate the process of developing an information system. One example of a software development methodology is the "Waterfall" development model. In the Waterfall model, developers use a sequential development approach in which development is seen as progressing through the phases of needs analysis, design, implementation, testing, integration, and maintenance.

Another example of a software development methodology is the "Agile" development model. In the Agile development model, developers iteratively and incrementally develop an information system. The changeable needs and solutions of each project are often determined through cooperation between individuals who have different functional expertise and who work toward a common goal. Agile development encourages the developers to respond to changes within the project, and also supports evolutionary development and delivery. The iterative approach that is performed in accordance with the Agile development model is generally performed within a fixed period of time.

SUMMARY

One embodiment is a software development tool for developing software that implements a customer's business processes. The software development tool determines a plurality of models to define the software to be developed, wherein at least one model of the plurality of models is a business model that comprises at least one business process, and the at least one business process is a set of interrelated business process paths that accomplish a business goal. The software development tool defines at least one business process path, wherein the at least one business process path is a route through the at least one business process taken during a single execution of the at least one business process, and the at least one business process path comprises at least one step. The software development tool maps the defined at least one business process path to a second model different than the business model, wherein the mapping identifies at least one part of the second model that implements the at least one step of the business process path. The software development tool builds the at least one business process path based on results of the mapping. The software development tool delivers the at least one business process path that has been built.

DETAILED DESCRIPTION

Figure 1:
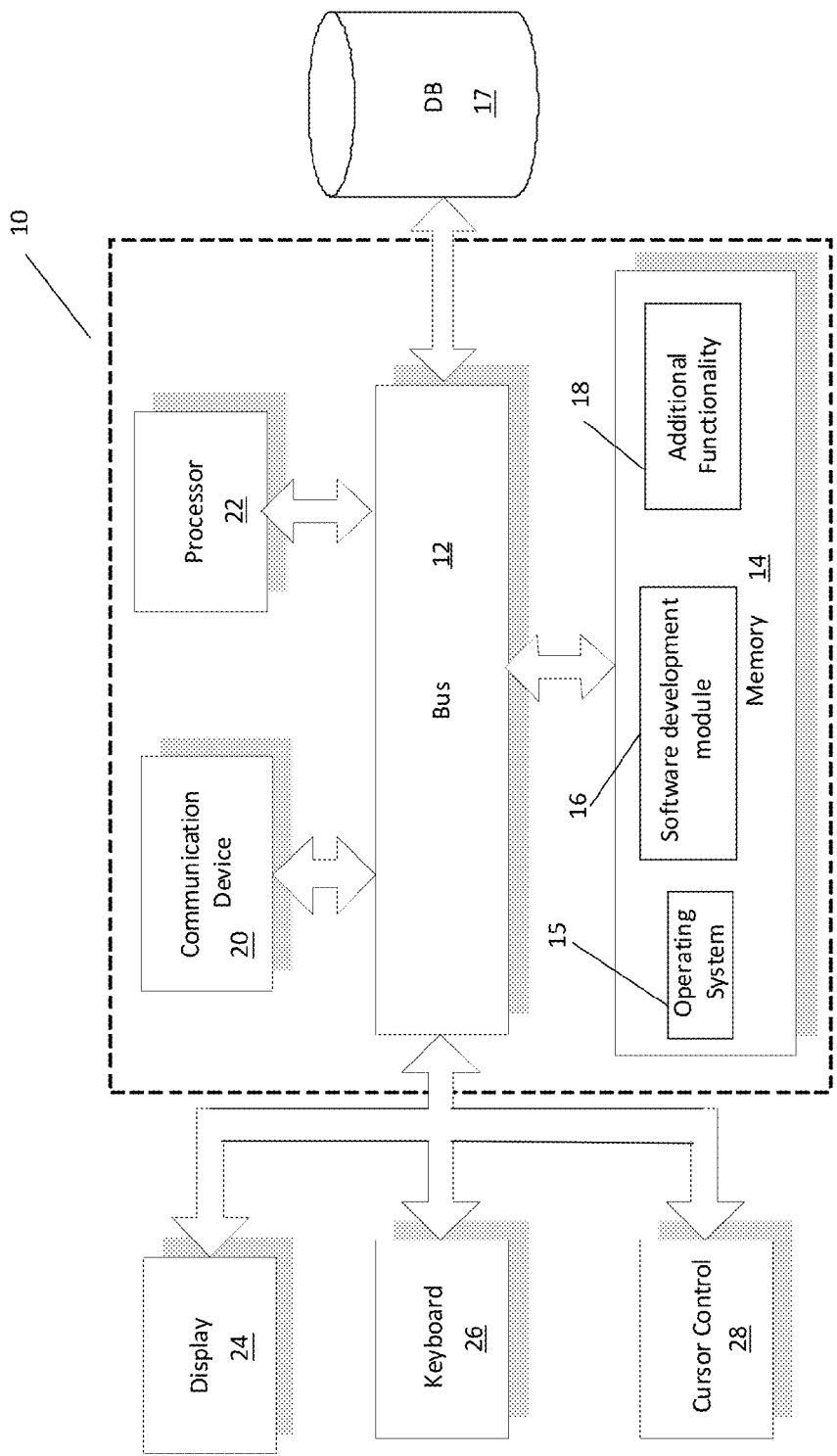
FIG. 1 is an overview block diagram of a computer system that provides a software development tool for developing software that implements a customer's business processes in accordance with an embodiment of the present invention.

One embodiment is a software development methodology that allows a user to: (1) produce software that implements a customer's business processes; (2) deliver content rapidly to the customer; and (3) deliver content incrementally in a way that is useful to the customer. The software development methodology uses business process paths as the central focus of the development process. Because the software development methodology uses business process paths as the central focus during the development process, each subsequent delivery of content to the customer expands the capabilities of an overall delivered product in a known, communicable way.

In developing software for customers, a variety of challenges arise. One challenge is that it may be difficult to release meaningful software updates to customers on a frequent basis. A meaningful software update is generally considered to be an update that is both understandable by and valuable to the customer.

Another challenge in software development is that it may be difficult to avoid wasteful development efforts when releasing the updates. As a result of wasteful development efforts, software development organizations often create and provide bloated software to customers because the software development organizations lose sight of the core requirements of the customers during the development process.

Another challenge in software development is that it may be difficult to react to a rapidly changing external environment. For example, certain capabilities of a software application might suddenly become essential for a successful product (e.g., a time-and-attendance application might suddenly require mobile capabilities to compete in the marketplace as a result of a sudden ubiquitous use of mobile devices). When a specific capability suddenly becomes essential to a software application, this capability needs to become an "instant" top priority for the software development organization. However, it may be difficult for the software development organization to change existing development plans of the software application without incurring large re-planning and re-estimation costs. In addition, changing development plans may result in introducing uncertainty in the development process, leading to lost productivity within the software development organization.

As another example of needing to react to a rapidly changing external environment, a software development organization working with customers who are early adopters may face pressure by the early adopters to develop certain capabilities ahead of others.

Another challenge in software development is that it may be difficult to avoid poor software quality due to ineffective and inefficient handover between the various parties (each party often having a different role than others) engaged in developing a piece of software.

In the previous methods of software development, no methodology or supporting toolset was available to sufficiently address all of the above challenges at the same time. Although agile development principles address some of the above challenges, agile development principles are insufficient in addressing all of the above challenges at the same time.

In the past, when software development organizations encountered the above problems, the software development organizations were providing their software to customers in a customer environment that was more forgiving. Customers were more accepting of long development cycles, long implementations, partially due to the fact that it was not clear how software models actually satisfied the customers' business processes, and copious documentation. Software development organizations tried to mitigate these problems through intelligent planning and communication, but, in the previous methods, there was no underlying methodology that could deal with these issues at the outset of a project. The current movement from on-premise software delivery models to software-as-a-service ("SaaS") software models is evidence that software development organizations are attempting to resolve the problems as previously described.

In contrast with the previous approaches, embodiments of the present invention allow a user to: (1) produce software that implements a customer's business processes; (2) deliver customer content rapidly; and (3) deliver content incrementally in a way that is useful to a customer.

FIG. 1 is an overview block diagram of a computer system 10 that provides a software development tool for developing software that implements a customer's business processes in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include a software development module 16 that provides a software development tool for developing software that implements a customer's business processes, as disclosed in more detail below. System 10 can be part of a larger system. Therefore, system 10 will typically include one or more additional functional modules 18 to include the additional functionality, such as functionality for receiving and processing a customer's business processes and corresponding business process paths. A database 17 is coupled to bus 12 to store data used with modules 16 and 18.

Figure 2:
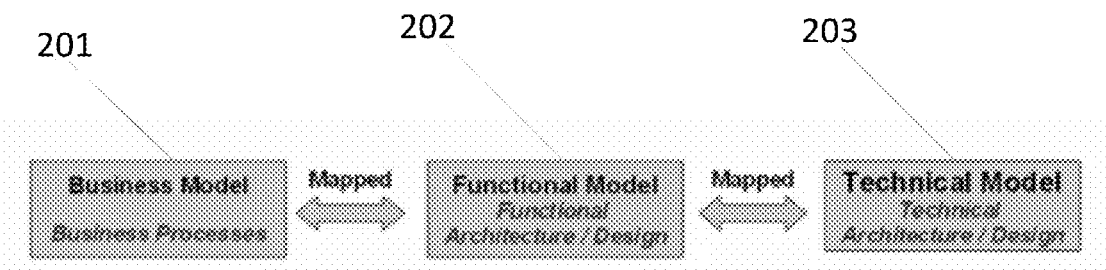
FIG. 2 illustrates three models that are used in accordance with one embodiment.

FIG. 2 illustrates three models that are used in accordance with one embodiment. Certain embodiments of the invention create various models to define a software application to be developed. In one embodiment of the invention, three models are used: a business model 201, a functional model 202, and a technical model 203. Although each model is defined independently, the models are related to one another through a mapping between them. Although certain embodiments use three models, other embodiments may use less or more models in the development process.

Business model 201 comprises business processes and sets of business process paths of the software application to be developed. A business process is considered to be a set of interrelated business process paths which accomplish a business goal. Business processes may also be considered as high-level business purposes, described in a natural way from a business perspective. Functional model 202 covers the functional architecture/design of the software application. Technical model 203 covers the technical architecture/design of the software application.

As described above, in one embodiment, business model 201 comprises business processes. The business processes may be presented in business process modeling notation ("BPMN") format. Each business process may comprise or be defined by business process paths. Each business process path is a particular route through a corresponding business process taken during a single execution of the business process. Further, in addition to defining a route through a corresponding business process, a business process path also contains additional information describing a traversal of the business process. For example, a business process path may include an annotation for each step on the chosen route through the business process. In one embodiment, a business process path is a use-case (i.e., a method of using a business process) tied to the business process.

As illustrated in FIG. 2, and as previously described, the models (201, 202, and 203) are related and mapped to each other. Mapping identifies which parts of one model represent/implement parts of another model. Mapping ensures that all of the features of one model flow through the design process into subsequent models and are fully implemented by the end of the development process. For example, suppose a user wishes to ensure that a specific business process is implemented. By fully mapping the specific business process, the mapping ensures that the business process is implemented by each of business model 201, functional model 202, and technical model 203.

Figure 3:
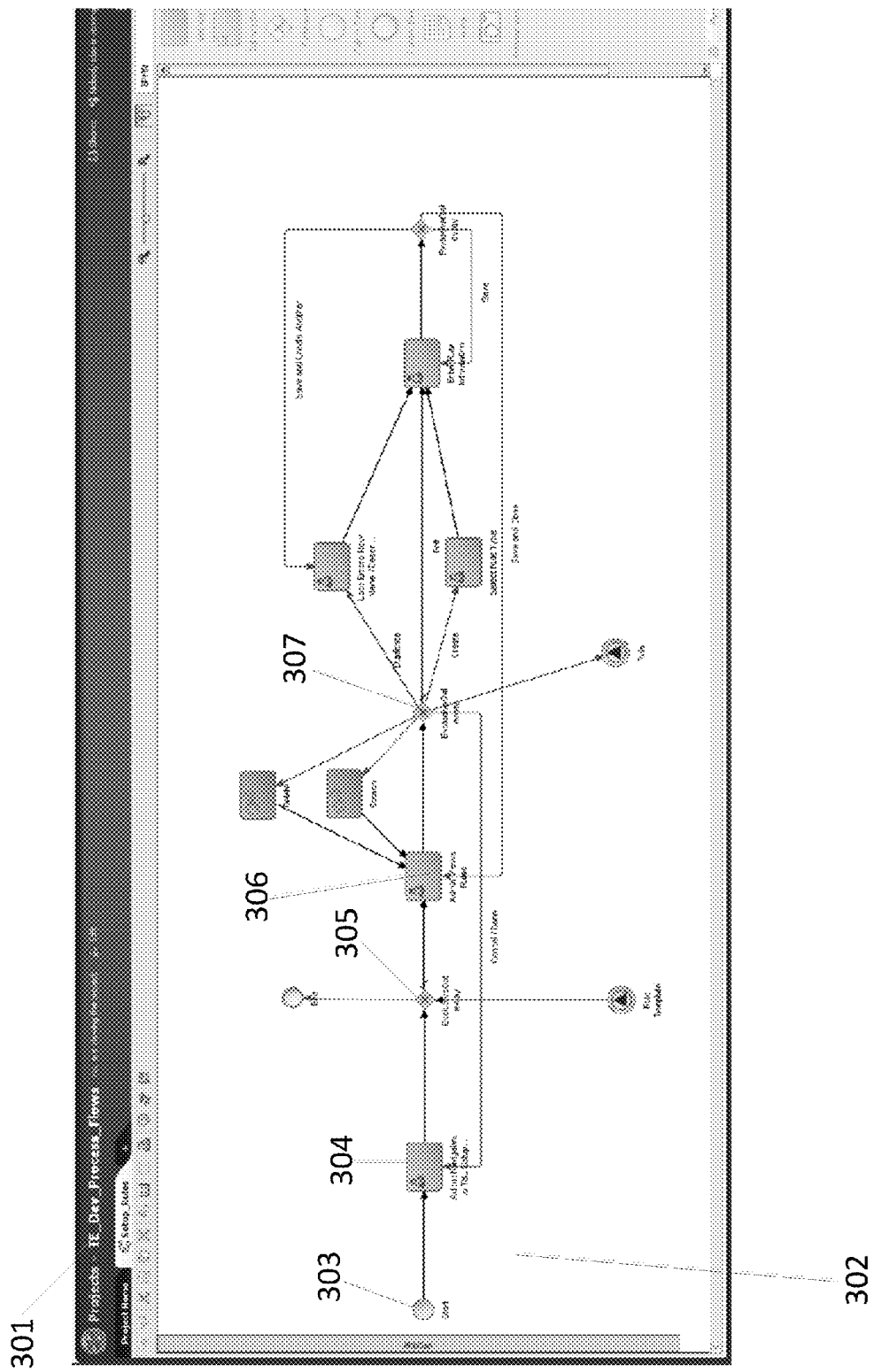
FIG. 3 is a screen shot of a business process diagram of a business model, shown via an interface, in accordance with one embodiment.

FIG. 3 is a screen shot of a business process diagram 302 of a business model, shown via an interface 301, in accordance with one embodiment. In one embodiment, a business process diagram 302 is used to illustrate each business process of business model 201 of FIG. 2.

Certain embodiments read business process diagrams created by other tools, in BPMN 2 format, for example, and includes them in business model 201 of FIG. 2. In another embodiment of the invention, users create and maintain business process diagrams "inline," either based on a proprietary format, or again, based on the BPMN 2 format.

Although business process diagram 302 is associated with business model 201 of FIG. 2, the business process diagram is not mapped directly to functional model 202 of FIG. 2. Instead, steps (303, 304, 305, 306, and 307) of corresponding business process paths of business process diagram 302 are mapped to functional model 202. In one embodiment, the functional model is a hierarchy in which its leaf nodes are mapped to the steps of the corresponding business process paths, as described in further detail below.

In one embodiment, the business process path is the atomic unit of content delivered to the customer. In other words, each business process path may be considered to be the fundamental unit of a deliverable piece of product functionality/capability to the customer. The functionality of such a fundamental unit is easily understood by every team involved in the development process and also by customers. As such, certain embodiments use the business process path as the atomic unit of content delivered in order to: (1) ensure functional integrity by mapping each particular business process path to the functional features that support that business process path in the product, and (2) to enable meaningful incremental delivery, as described above. A software application is built out over the layering of many business process paths, delivered iteratively.

Certain embodiments allow a user to create any number of business process paths, based on the business processes present in a business model, and include them in business model 201 of FIG. 2. In another embodiment, users may select nodes in a business process (the nodes corresponding to steps within corresponding business process paths) and then annotate each step of the business process path as desired. In another embodiment, a user may draw business process paths graphically onto business process diagram 302, adding annotation as desired.

For example, suppose that a software development process aims to deliver a business process generally directed to "processing timecards." This overall business process may comprise many business process paths (e.g., different ways to process time cards). The software development process may deliver a first business process path (e.g., a first way to process time cards) directed to "entering and saving a project-based timecard." Next, at a later time, the development process might deliver a different business process path (of the same business process) directed to "submit a payroll-based time card." Over time, with the delivery of many different business process paths of a same business process, the whole business process will be fully implemented by the development process.

As described above, in one embodiment, each business process path is mapped to the functional model. Specifically, each step in a given business process path is mapped to one or more functional features. Mapping is performed in a minimalistic manner so that only the functional features that are necessary for performing a step in a business process path are mapped to that step of that business process path.

Each mapping may also require signoff by interested parties/reviewers in order to ensure that the mappings are performed properly. In one embodiment "interested parties" are deemed to comprise individuals who authored or modified the objects involved in the mapping plus any users of a tool who have a registered interest in any of the objects involved in the mapping through some kind of "watchlist" functionality. Signoff may be used to ensure that a bare minimum collection of functional features that are required to enable a business process path have been selected. As such, certain embodiments allow users to avoid "functionality bloat" of the software.

Figure 4:
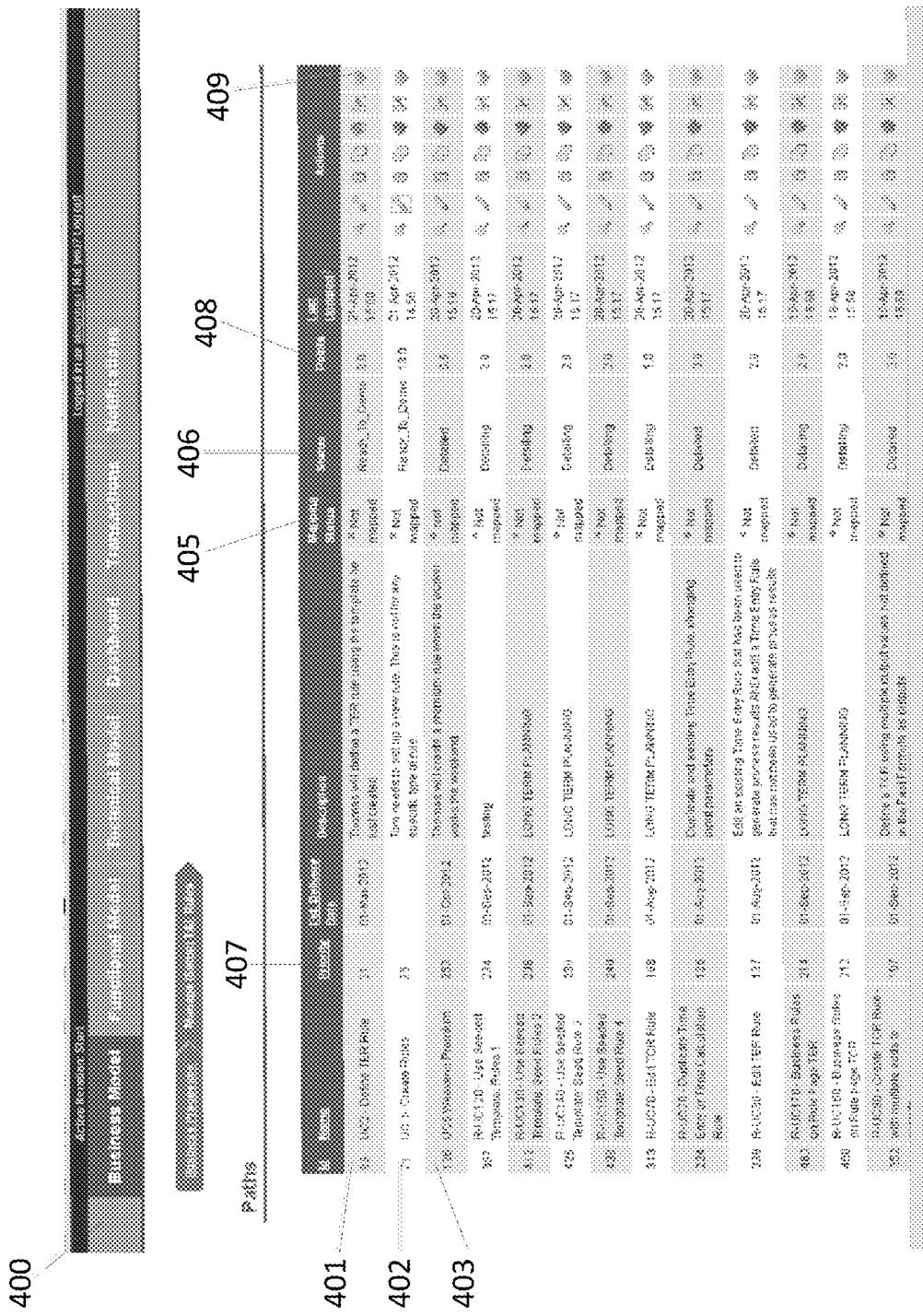
FIG. 4 is a screen shot of business process paths of a business process, shown via an interface, in accordance with one embodiment.

FIG. 4 is a screen shot of business process paths of a business process, shown via an interface 400, in accordance with one embodiment. Interface 400 provides a list of business process paths (401, 402, and 403) that correspond to the business process illustrated by business process diagram 302 of FIG. 3. Interface 400 also allows a user to switch between the "Business Model", "Functional Model", and "Technical Model".

As illustrated in FIG. 4, interface 400 provides a mapping status 405, a development status 406, a priority 407, and point score 408. Mapping status 405 provides an indication to a user regarding whether each business process path has been fully mapped to other models (e.g., the functional model). For example, in one embodiment, the status of a path becomes "mapped" when all of the steps in the path have been mapped and have been signed off by the relevant interested parties. Interface 400 also includes development status 406 that provides an indication to a user regarding how the business process path is progressing within a lifecycle of development of the business process path. Interface 400 also includes icon 409 that allows a user to register as an interested party.

By showing how each business process path is progressing within a lifecycle of development, certain embodiments allow a user to manage the lifecycle of the business process path. A business process path goes through many development stages (which can also be thought of as statuses and are reflected by development status 406, for example) from its creation to completion. Actions within a development stage may be performed explicitly (e.g., via manual intervention by a user), or through information derived from other systems, or by the system itself. Actions within a development stage may also be performed automatically based on input from outside systems that work, in some way, with the path. For example, a separate, agile-development-based build tool that builds the path may perform actions that progress the path through a development stage. Similarly, transitions between development stages may also be performed explicitly, or through information derived from other systems, or by the system itself.

As an example of manually transitioning between development stages, a "ready to demo" status may be set manually when a development resource building a business process path is ready for the demo to take place on the path. Even though the transitioning between development stages is performed manually, the system can still validate the status change if it is an appropriate change. The exact development stages in the life-cycle of a path may vary depending on each chosen implementation, but some example statuses of development stages include: (1) Placeholder (where the known characteristics of the path include a provisional name), (2) Detailed (requires the path to have steps defined), (3) Mapped (requires path to have been mapped and signed off), (4) Building (path has been moved into development phase), (5) Built, (6) Ready to Demo, (7) Demoed (Demo given to Quality Assurance ("QA")—manual update made by QA), (8) Ready for QA (mandatory fixes made—no showstopper issues against path), (9) In QA, and (10) Complete, for example.

Because the driver of incremental delivery (the business process path) has a life-cycle, the progress of the delivering each increment can be monitored. As such, incremental delivery is enabled.

Other embodiments allow a user to log issues against any object in any of the models or mappings between the models. Existing issues, linked indirectly or directly to the path, can be used to stop the path from progressing through its life-cycle, if necessary. This provides a centralized issue/defect tracking component required for real-world development.

Interface 400 also provides a priority 407 for each business process path. In one embodiment, business process paths are created and prioritized as soon as a corresponding business process is created, as described in more detail below. Interface 400 also provides point scores 408. Point scores 408 may be assigned to each business process path, as described in more detail below.

Figure 5:
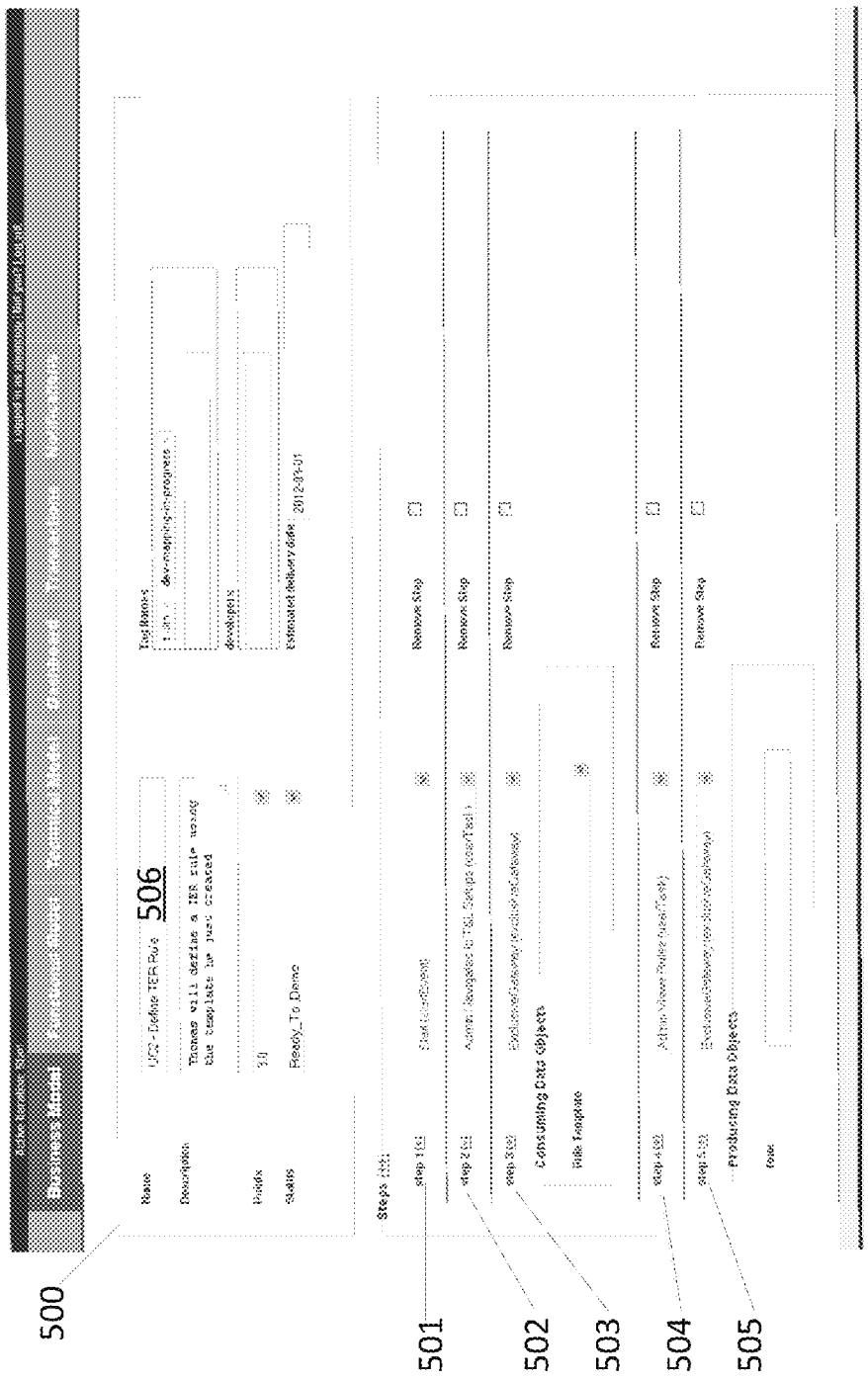
FIG. 5 is a screen shot of a single business process path, via an interface, in accordance with one embodiment.

FIG. 5 is a screen shot of a single business process path, via an interface 500, in accordance with one embodiment. In one embodiment, a single business process path with a name "UC2-Define TER Rule" 506 is shown via interface 500. As shown in FIG. 5, the single business process path includes steps 1-5 (501, 502, 503, 504, and 505). Steps 1-5 (501, 502, 503, 504, and 505) of FIG. 5 correspond to steps 303, 304, 305, 306, and 307 of the business process diagram 302 of FIG. 3.

Figure 6:
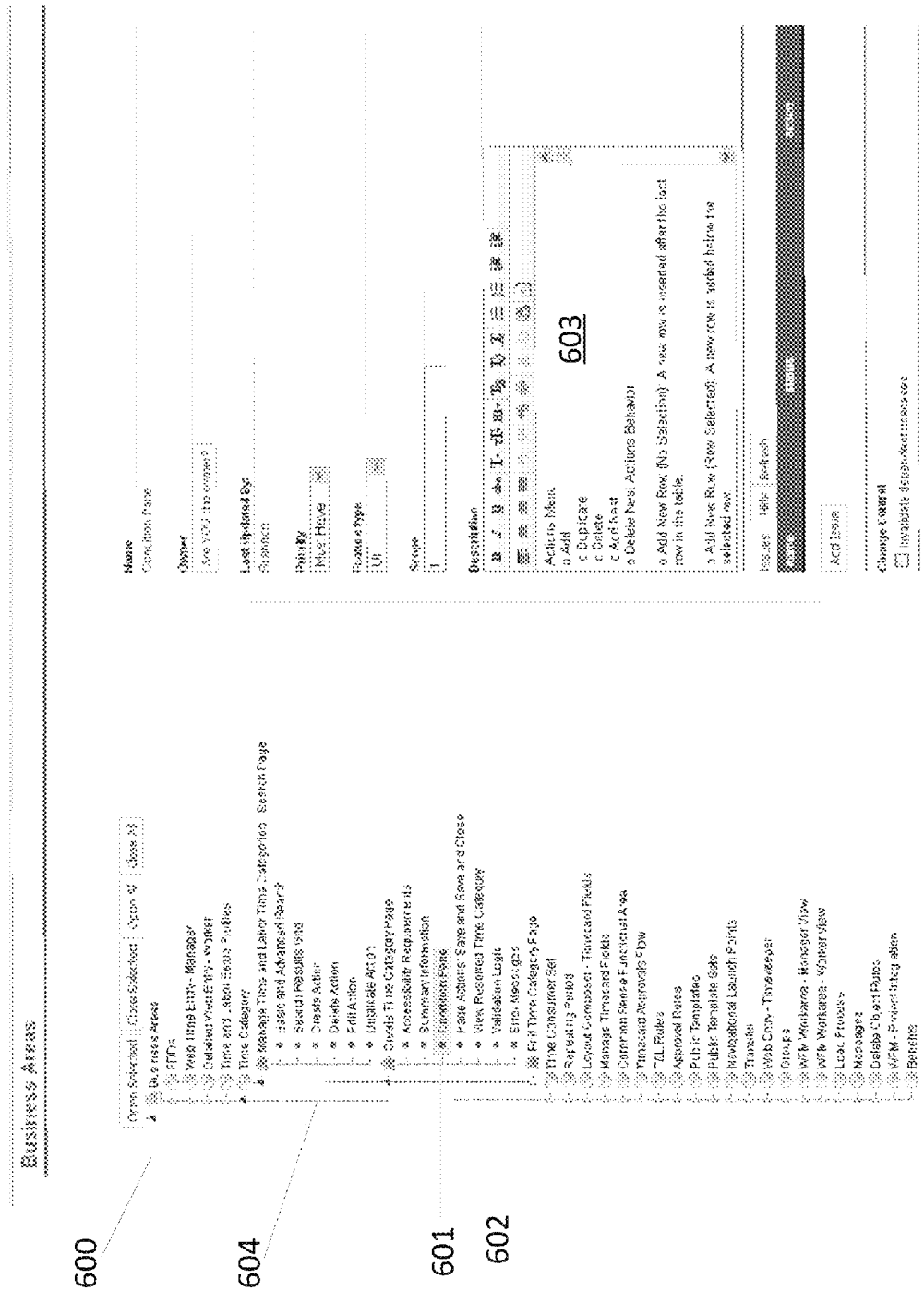
FIG. 6 is a screen shot of a functional model, shown via an interface, in accordance with one embodiment.

FIG. 6 is a screen shot of a functional model, via an interface 600, in accordance with one embodiment. In one embodiment, the functional model is represented as a hierarchy (tree) 604 of arbitrary depth allowing the software application's features to be decomposed to an arbitrary level of specificity/granularity. Each node (e.g., 601 and 602) in the tree may be referred to as a functional feature. In one embodiment, interface 600 allows a user to describe each feature through textual documentation 603 (e.g., for node 601) and graphical documentation, and classify each feature along any lines deemed useful to functional design. The functional features (601 and 602) contained by the functional hierarchy 604 support and enable the steps performed by each business process path, as described above.

Figure 7:
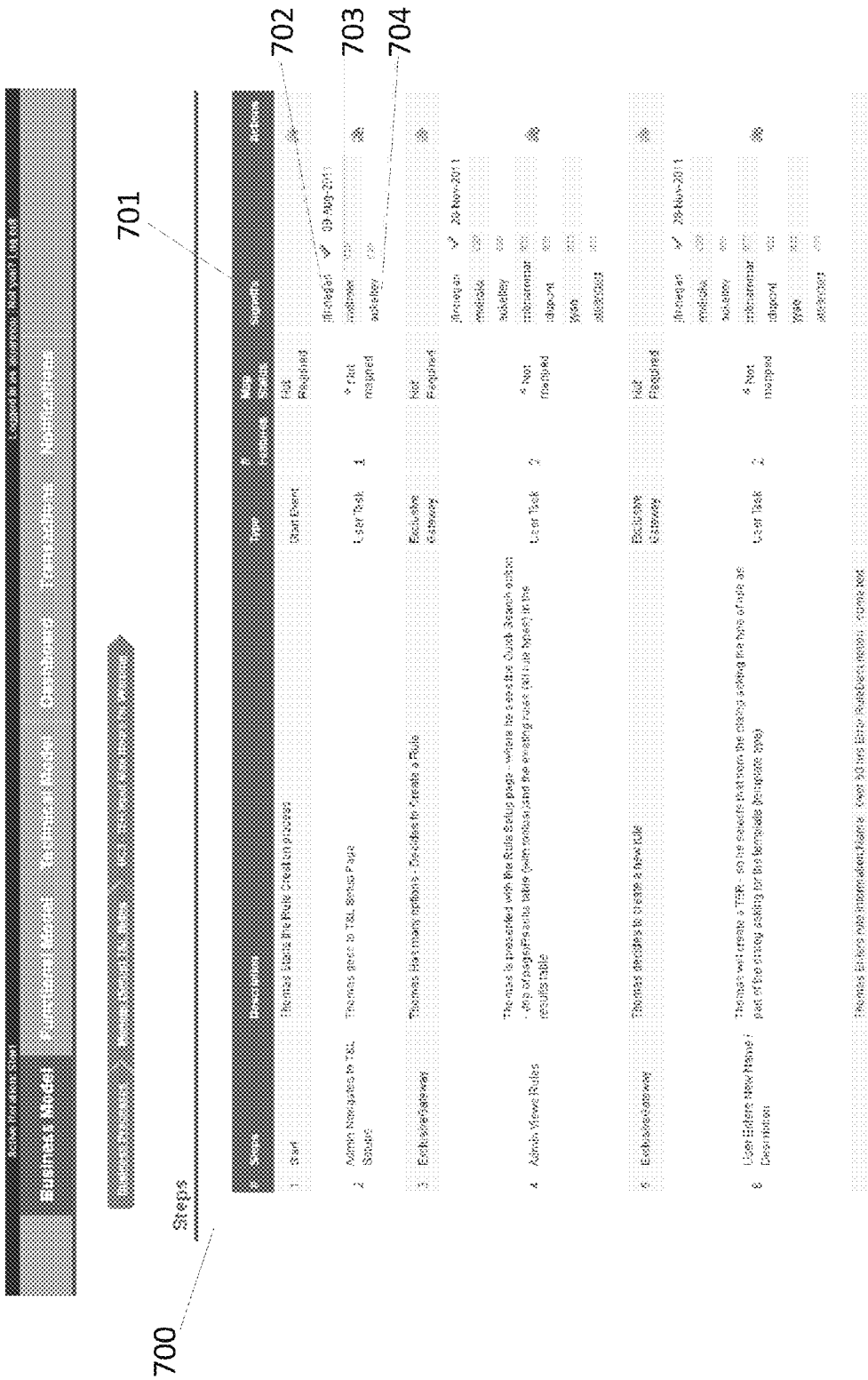
FIG. 7 is a screen shot of mapping information between a business model and a functional model, shown via an interface, in accordance with one embodiment.

FIG. 7 is a screen shot of mapping information between a business model and a functional model, shown via an interface 700, in accordance with one embodiment. As previously described, signoffs 701 may be used to ensure that the steps of a business process path are properly mapped to functional features. Interface 700 shows signoff information 701 for each step of a business process path. For path step "Admin Navigates to T&L Setups," there are three interested parties (702, 703, and 704). As shown in FIG. 7, "jfinnegan" has signed off (i.e., approved) the mapping, while "mvilrokx" and "aokelley" have not yet signed off on the particular mapping.

Figure 8:
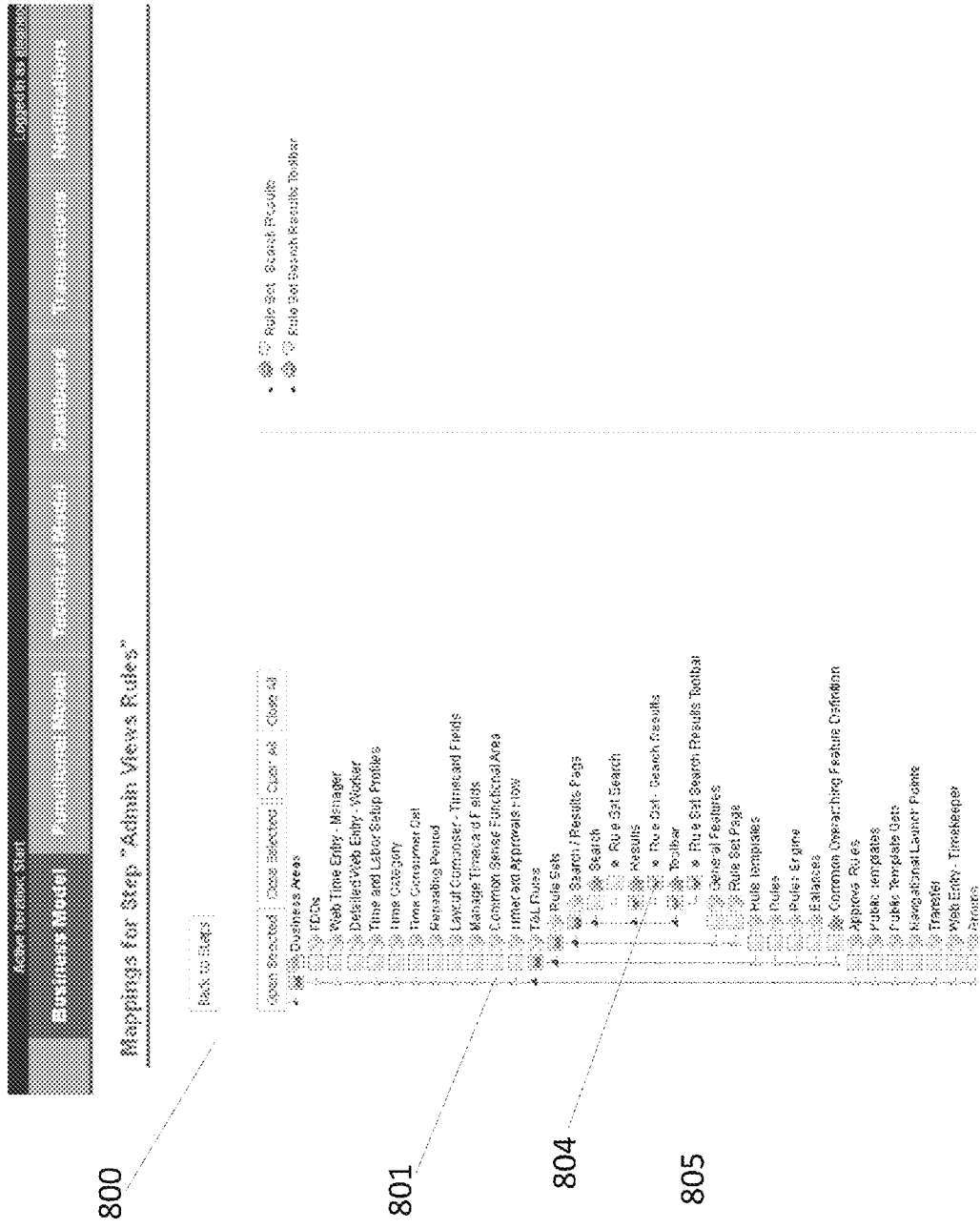
FIG. 8 is a screen shot of a hierarchy of the functional model that shows which functional features are mapped to business process paths, shown via an interface, in accordance with one embodiment.

FIG. 8 is a screen shot of a hierarchy 801 of the functional model that shows which functional features are mapped to business process paths, shown via an interface 800, in accordance with one embodiment. As shown in FIG. 8, a step entitled "Admin Views Rules" for a business process path is mapped to two functional features of the functional model. Specifically, the step is currently mapped to functional feature "Rule Set—Search Results" 804 and functional feature "Rule Set Search Results Toolbar" 805 within hierarchy 801.

Figure 9:
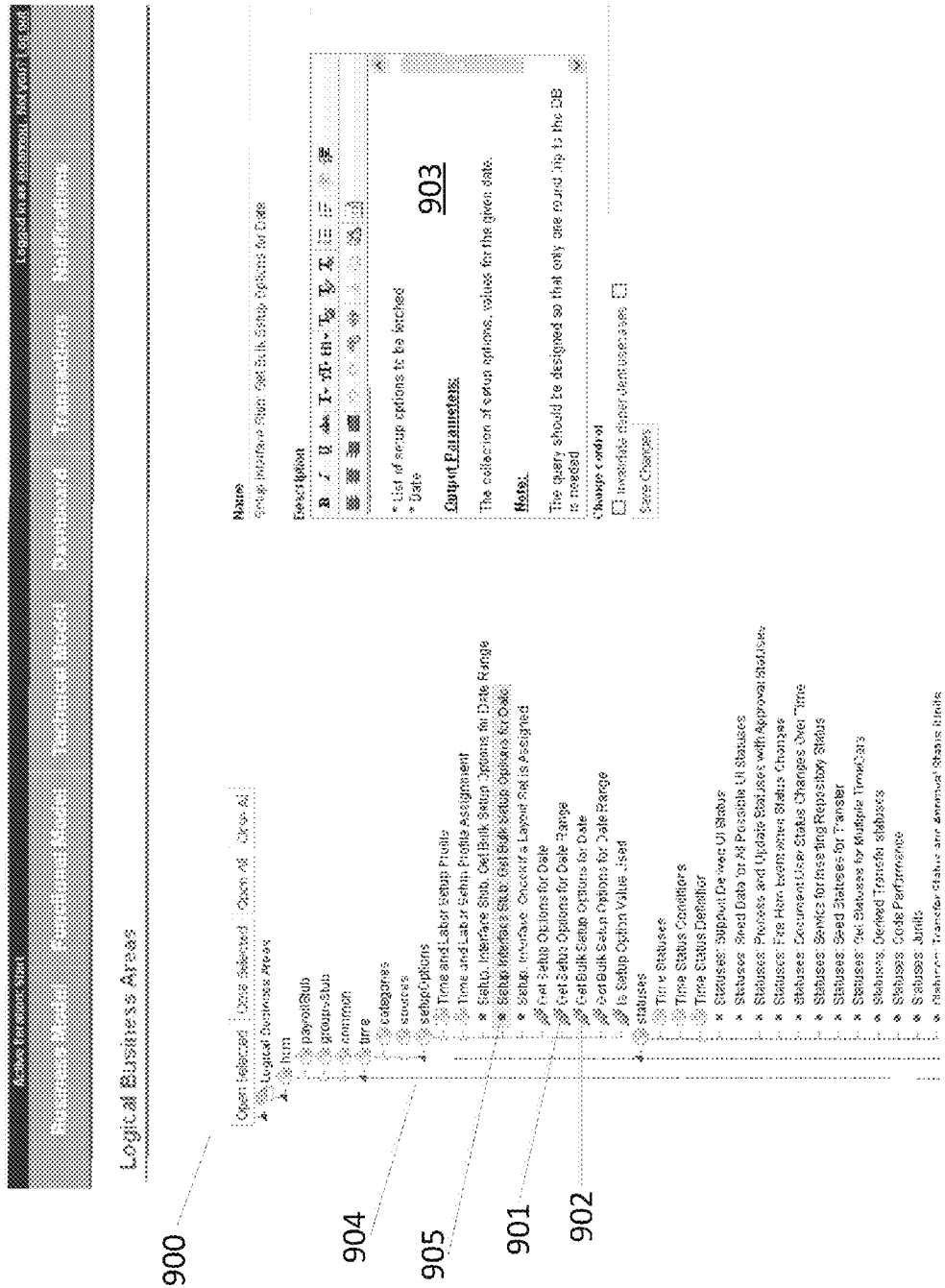
FIG. 9 is a screen shot of a technical model, shown via an interface, in accordance with one embodiment.

FIG. 9 is a screen shot of a technical model, shown via an interface 900, in accordance with one embodiment. As previously described, the technical model may cover the technical architecture and design of the software application. In one embodiment, the technical model is represented as a hierarchy (tree) 904 of arbitrary depth that allows a software application's technical components to be decomposed to an arbitrary level of granularity. Each node in the tree (e.g., 901 and 902) is referred to as a technical feature. In one embodiment, interface 900 allows a user to describe each technical feature through textual 903 (e.g., for node 905) and graphical documentation, and classify the technical feature along the lines deemed useful for technical design.

As previously described, in one embodiment, a formal signoff may be used to ensure that features within the business model and the functional model are properly mapped to each other. Certain embodiments may also use a similar signoff procedure to ensure that features within the functional model are properly mapped to features within the technical model. When an interested party signs off on a mapping between a functional model feature and corresponding technical features, the interested party indicates that, if the technical features are implemented, the implemented technical features will properly support the functional features mapped thereto. After a business process path is fully mapped across all models, a complete list of corresponding technical features that support the path can be seen. Specifically, once each created business process path is mapped to features of a functional model, and the features of the functional model are mapped to a technical model, a path build list for the business process path is created.

As described above, in one embodiment, business process paths are created and prioritized for processing as soon as a business process is created. As business process paths are created, they may be added to a backlog of business process paths and be prioritized to be built. The priority may be determined by a forced-ranking so that it is clear which path needs to be built next. Re-scoping of the project may be performed by changing the forced rankings of paths. When a project is re-scoped, certain functionality may be pushed aside for later implementation.

In contrast to the waterfall approach of software development (in which the software development process sequentially progresses through development phases), multiple business process paths can be worked on in parallel.

Certain embodiments may be configured such that path build list may be presented to any downstream tools for their development, either iteratively developed or developed otherwise.

In one embodiment, once a business process path is fully mapped, the build list corresponding to the path is pushed into a build tool. The build tool may support agile development. The path is then built by the development process over various iterations. Quality assurance may then be performed on the built paths.

In the event that a functional or technical model is updated during the software development process, certain mappings between the models may be affected. For example, suppose a user decides to update technical features in a technical model. Some or all of the mappings to those updated technical features may then be invalidated. A new mapping may need to be made between the updated technical features, the functional features, and/or the business model. Certain embodiments may detect changes to any of the models in question and invalidate mappings as required. Certain embodiments may also notify any interested parties of any changes to any parts of the models or mappings In another embodiment, a software development methodology allows a user to label business process paths in order to track progress against various internal and external milestones. For example, suppose a user is developing 200 business process paths. Of the 200 business process paths that need to be developed, 100 paths could be labeled in accordance to a first release of a product, 50 paths could be labeled in accordance to a next release, and 50 paths could be labeled in accordance to a third release. These labels may change as desired at any point during the development process.

In another embodiment, as described above, the software development process may assign point scores (as shown by point scores 408 of FIG. 4) to each business process path. For example, the user may "point score" the cost of development of business process paths such that, as business process paths are being built, the velocity of a development team or organization can be approximated such that expected completion dates can be associated with the forced-ranked business process paths. Such functionality allows users to plan various aforementioned releases.

In another embodiment, the software development process enables a user to track dependencies between business process paths. Dependencies between different business process paths necessarily determine a required build order, wherein a business process path dependent upon an independent business process path will be built after the independent process path, for example.

In one embodiment, dependencies are determined by specifying data objects in business processes and then naming specific instances of those business objects as business process paths are created. When an object is consumed by a step in the business process, a business process path using that step names the object instance required by that given path. Thus, a dependency is established between a producing and consuming path. For example, referring again to FIG. 5, once the single business process path of FIG. 5 has been defined, a consumed object "Rule Template" may be named. See box for entering name for "Rule template" in step 3 (503) of FIG. 5. A produced object "Rule" may also be named. See box for entering name for "Rule" in step 5 (505) of FIG. 5. As such, in certain embodiments, the dependencies between drivers of incremental delivery (the driver being the business process path, for example) may be tracked. If the dependencies between drivers of incremental delivery are not managed, then a user may not readily re-plan/re-scope the project.

In another embodiment, the software development process allows a user to freely re-rank business process paths to react to changing market or external pressures. These re-ranked paths automatically change the order in which the paths will be built out. Because certain embodiments have determined the dependencies between business process paths, a user will know if certain groups of paths need to be further re-prioritized because of their dependencies. Downstream processes, such as build activity, may dictate that certain paths can no longer be re-prioritized.

The tool may allow for paths to be locked in position to deal with this situation. This locking may be related to the statuses of the Business Process Path Lifecycle, as further described below. In one embodiment, once a certain percentage of a first business process path has been built, then this first path can no longer be prioritized below a second path where build activities have started for the second path. In another embodiment, to take greater account of path dependencies, a first path cannot be prioritized below any second path that has not yet had its build started if a certain percentage of the cost of the first path, and all of its dependent paths, have been built. In another embodiment, when deciding allowable reprioritization actions, activities other than build activities may be taken into account. For example, reprioritization may or may not be allowed based upon various statuses (and completion percentages of those statuses) of the paths and related paths (e.g., dependent paths).

In another embodiment, the software development process allows a user to see the coverage of business processes by paths that have been built out. In one embodiment this leads to a "heat map" laid over the business process diagram. The heat map also allows a user to see, at a glance, which parts of the business process are heavily used by the built business process paths and which business process paths are yet to be built.

In another embodiment, the software development process allows a user to interface with external systems, as necessary, to monitor the complete path lifecycle. For example, in one embodiment, the tool can integrate with an external QA tool, such as a quality control ("QC") tool to show the current QA status of a path being developed. The ability to integrate with external systems allows for the successful deployment of the software development process in any real-world situation.

Figure 10:
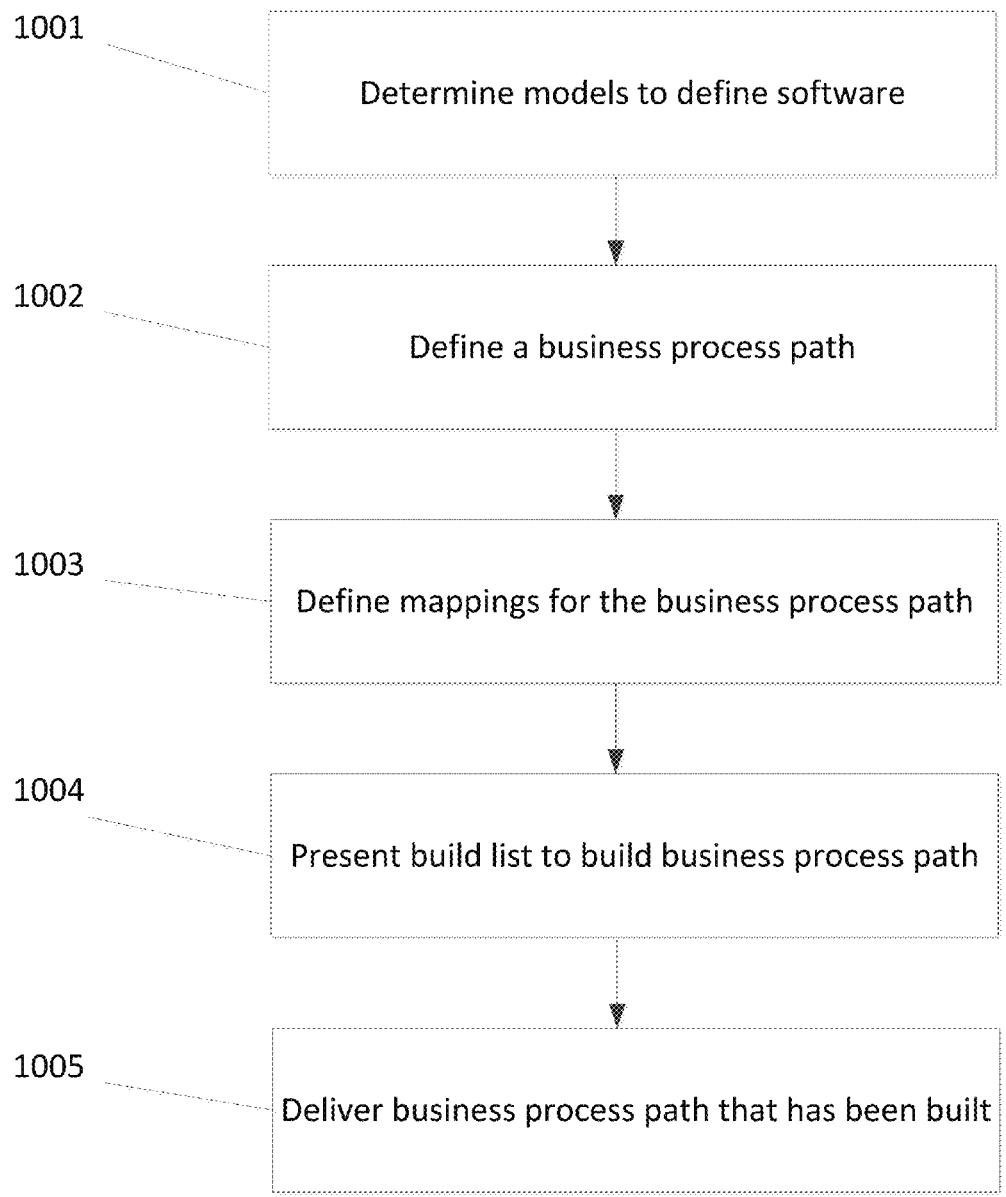
FIG. 10 is a flow diagram of the functionality of the software development module of FIG. 1 in accordance with one embodiment.

FIG. 10 is a flow diagram of the functionality of software development module 16 of FIG. 1 in accordance with one embodiment. In one embodiment, the functionality of the flow diagram of FIG. 10 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1001, the models used to define a software application to be developed are determined. As previously described, these models may include a business model 201, a functional model 202, and a technical model 203, as shown in FIG. 2. As previously described, the business model may comprise business processes and business process paths.

At 1002, the user may define a business process path that is a particular route through a business process of business model 201.

At 1003, the user may define mappings for the defined business process path. As previously described, in defining mappings, steps of the defined business process paths may be mapped to a model, such as functional model 202. After all mappings are finished for a business process path, a path build list is formed.

At 1004, in one embodiment, the user may present the path build list to a build tool so that the business process path is built.

At 1005, the user delivers the business process path that has been built to a customer.

In view of the above, certain embodiments allow a user to better communicate the capabilities of a software product being built to those in the software vendor's organization and to customers. The improved communication can be achieved by using the business process path, for example, as the universal language between these different parties. The previous methods did not indicate a particular model or component of a model as being the central focus of the development process for all parties involved.

As described above, certain embodiments allow for true incremental delivery. Because each built business process path has real functional meaning, each delivered business process path expands the capability of a delivered product in a known, communicable way. As such, customers can more readily ascertain whether they are going to derive value from a given increment or not. By combining multi-level mapping with independently functionally meaningful components of a driving level (e.g., the business process path), a way of achieving functionally meaningful incremental delivery is achieved.

As described above, certain embodiments also allow users to re-prioritize parts of a project (e.g., re-prioritize the building of different business process paths) in response to external factors with little or no cost to the development organization.

As described above, certain embodiments allow users to improve software quality through effective handover between the various parties (with various roles) engaged in developing a piece of software. The mapping between models means that the desired capabilities can be built out exactly as intended.

As described above, certain embodiments allow users to easily perform impact analysis. If a user makes a change to any model, certain embodiments can immediately communicate an impact to other models. For example, as described above, if a technical change is made to certain technical features, an evaluation may be performed regarding whether any of the functional features mapped to the changed technical features are impacted. Similarly, a quality assurance organization can be notified that business process paths associated with the changed technical features should be re-tested. As such, a user can therefore see both regular impact analysis and see the impact of re-prioritization/re-scoping of any delivery increments/paths.

Further, certain embodiments document the software design process within an audited database. As such, the user is provided with a complete and up-to-date definition of the software application, and no out-of-date design documents are present.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium including instructions stored thereon that, when executed by a processor, cause the processor to provide a software development tool for developing software that implements a customer's business processes, the providing comprising:
   determining a plurality of models to define the software to be developed, wherein at least one model of the plurality of models is a business model that comprises at least one business process, and the at least one business process is a set of interrelated business process paths that accomplish a business goal, wherein one of the plurality of models is a functional model that comprises functional features performed by the software to be developed;
   defining at least one business process path, wherein the at least one business process path is a route through the at least one business process taken during a single execution of the at least one business process, and the at least one business process path comprises at least one step to be performed by the software to be developed;
   mapping the defined at least one business process path to the functional model, wherein the mapping identifies, for each step of the defined at least one business process path, at least one corresponding part of the functional model that implements the at least one step of the business process path; and
   building the software, which implements each step of the at least one business process path that has been mapped to the functional model that comprises the functional features.

2. The computer readable medium of claim 1, wherein the providing further comprises incrementally delivering the software that has been built to the customer.

3. The computer readable medium of claim 1, the providing further comprising:
   defining other business process paths of the at least one business process; and
   mapping other business process paths of the at least one business process to the functional model, wherein the mapping identifies, for each step of the other business process paths, at least one corresponding part of the functional model that implements said step of the other business process paths;
   wherein the building the software comprises building the software to implement the other business process paths of the at least one business process based on results of the mapping other business process paths; and
   wherein the software implements each step of all of the business process paths of the at least one business process that has been mapped to the functional model that comprises the functional features.

4. The computer readable medium of claim 1, wherein one of the plurality of models is a technical model that relates to the technical design of the software and the providing further comprising mapping the at least one corresponding part of the functional model to the technical model.

5. The computer readable medium of claim 4, wherein the determining of the technical model is independent of the determining of the functional model.

6. The computer readable medium of claim 1, wherein each mapping requires approval by reviewers.

7. The computer readable medium of claim 1, wherein the determining of the business model is independent of the determining of the functional model.

8. The computer readable medium of claim 1, wherein the providing further comprises delivering the software that has been built to the customer.

9. A method for providing a software development tool for developing software that implements a customer's business processes, the method comprising:
   determining a plurality of models to define the software to be developed, wherein at least one model of the plurality of models is a business model that comprises at least one business process, and the at least one business process is a set of interrelated business process paths that accomplish a business goal, wherein one of the plurality of models is a functional model that comprises functional features performed by the software to be developed;
   defining at least one business process path, wherein the at least one business process path is a route through the at least one business process taken during a single execution of the at least one business process, and the at least one business process path comprises at least one step to be performed by the software to be developed;
   mapping the defined at least one business process path to the functional model, wherein the mapping identifies, for each step of the defined at least one business process path, at least one corresponding part of the functional model that implements the at least one step of the business process path; and
   building the software, which implements each step of the at least one business process path that has been mapped to the functional model that comprises the functional features.

10. The method of claim 9, further comprising incrementally delivering the software that has been built to the customer.

11. The method of claim 9, further comprising:
   defining other business process paths of the at least one business process; and mapping other business process paths of the at least one business process to the functional model, wherein the mapping identifies, for each step of the other business process paths, at least one corresponding part of the functional model that implements said step of the other business process paths;

wherein the building the software comprises building the software to implement the other business process paths of the at least one business process based on results of the mapping other business process paths; and wherein the software implements each step of all of the business process paths of the at least one business process that has been mapped to the functional model that comprises the functional features.

12. The method of claim 9, wherein one of the plurality of models is a technical model that relates to the technical design of the software and further comprising mapping the at least one corresponding part of the functional model to the technical model.

13. The method of claim 9, wherein each mapping requires approval by reviewers.

14. The method of claim 9, further comprising delivering the software that has been built to the client.

15. A software development system for developing software that implements a customer's business processes, the software development tool comprising:
   a processor;
   a memory coupled to the processor;
   a software development module that:
      determines a plurality of models to define the software to be developed, wherein at least one model of the plurality of models is a business model that comprises at least one business process, and the at least one business process is a set of interrelated business process paths that accomplish a business goal, wherein one of the plurality of models is a functional model that comprises functional features performed by the software to be developed;
      defines at least one business process path, wherein the at least one business process path is a route through the at least one business process taken during a single execution of the at least one business process, and the at least one business process path comprises at least one step to be performed by the software to be developed;
      maps the defined at least one business process path to the functional model, wherein the mapping identifies, for each step of the defined at least one business process path, at least one corresponding part of the functional model that implements the at least one step of the business process path; and
      builds the software, which implements each step of the at least one business process path that has been mapped to the functional model that comprises the functional features.

16. The software development system of claim 15, wherein the software development module further incrementally delivers the software to the customer.

17. The software development system of claim 15, wherein the software development module further:
   defines other business process paths of the at least one business process;
   maps other business process paths of the at least one business process to the functional model, wherein the mapping identifies, for each step of the other business process paths, at least one corresponding part of the functional model that implements said step of the other business process paths; and
   builds the software to implement the other business process paths of the at least one business process based on the mapping the other business process paths;
   wherein the software implements each step of all of the business process paths of the at least one business process that has been mapped to the functional model that comprises the functional features.

18. The software development system of claim 15, wherein one of the plurality of models is a technical model that relates to the technical design of the software and the software development module maps the at least one corresponding part of the functional model to the technical model.

19. The software development system of claim 15, wherein each mapping requires approval by reviewers.

20. The software development system of claim 15, wherein the software development module delivers the software that has been built to the client.

* * * * *

UNITED STATES PATENT AND TRADEMARK OFFICE
CERTIFICATE OF CORRECTION

PATENT NO.        : 9,134,970 B2
APPLICATION NO.   : 13/737990
DATED             : September 15, 2015
INVENTOR(S)       : Ioannou et al.

Page 1 of 1

It is certified that error appears in the above-identified patent and that said Letters Patent is hereby corrected as shown below:

On the title page

Column 2, item [56], line 2, delete "developnnent," and insert -- development, --, therefor.

Column 2, under Assistant Examiner, line 1, delete "Ralukdar" and insert -- Talukdar --, therefor.

In the specification

Column 8, line 61, delete "mappings" and insert -- mappings. --, therefor.

In the claims

Column 11, line 62, claim 1, delete "path" and insert -- path, --, therefor.

Column 12, line 59, claim 9, delete "path" and insert -- path, --, therefor.

Column 14, line 11, claim 15, delete "path" and insert -- path, --, therefor.

Signed and Sealed this
Twenty-fourth Day of May, 2016

Michelle K. Lee
*Director of the United States Patent and Trademark Office*